United States Patent [19]
Powell et al.

[11] 3,782,398
[45] Jan. 1, 1974

[54] APPARATUS FOR TRANSPORTING, UNLOADING AND PROCESSING LIVE POULTRY

[76] Inventors: James B. Powell, 8 Bon Haven; Beverly G. Yeiser, Robin Rd.; Joseph R. Lightner, Rt. 4, all of Winchester, Ky. 40391

[22] Filed: May 22, 1972

[21] Appl. No.: 255,842

[52] U.S. Cl............... 134/133, 21/91, 119/17, 134/151, 134/165, 134/199, 198/19, 214/89
[51] Int. Cl................................. B08b 3/00
[58] Field of Search................ 214/89; 134/133, 134/151, 165, 199; 21/91; 198/19, 20

[56] References Cited
UNITED STATES PATENTS
3,662,712   5/1972   Singer................... 119/17
3,727,581   4/1973   Brent.................... 119/17

*Primary Examiner*—Albert J. Makay
*Attorney*—John W. Melville et al.

[57] ABSTRACT

Apparatus and method for loading, transporting, unloading and processing live poultry, wherein poultry is loaded into foraminous metal enclosures, each enclosure having a plurality of tiers of superimposed compartments of equal size, a slidable access door to each enclosure, readily releasable locking means for each door, and rollers mounted on the bottom of each enclosure. Track means are provided at a processing plant along which said enclosures are aligned and moved through unloading stations, with means at a final unloading station to elevate each enclosure to facilitate unloading the lowermost compartments, and a washer-sterilizer into which an unloaded enclosure is moved and subjected to high-velocity jets of hot water, steam, detergent, germicide and the like to clean & sterilize all surfaces. The enclosures are placed in a truck trailer when loaded with poultry for transportation to the processing plant and are returned in the same manner after unloading and cleaning.

7 Claims, 12 Drawing Figures

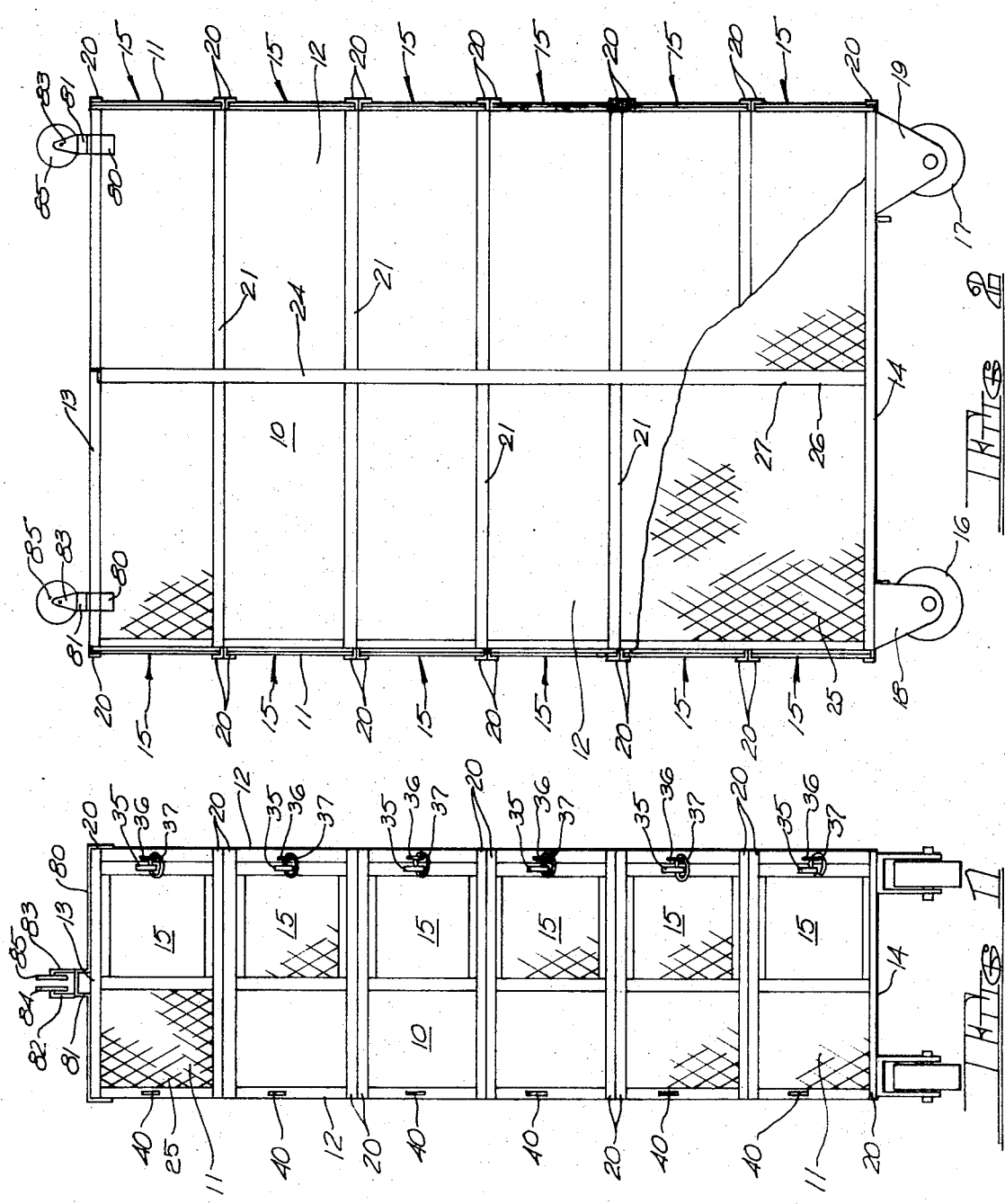

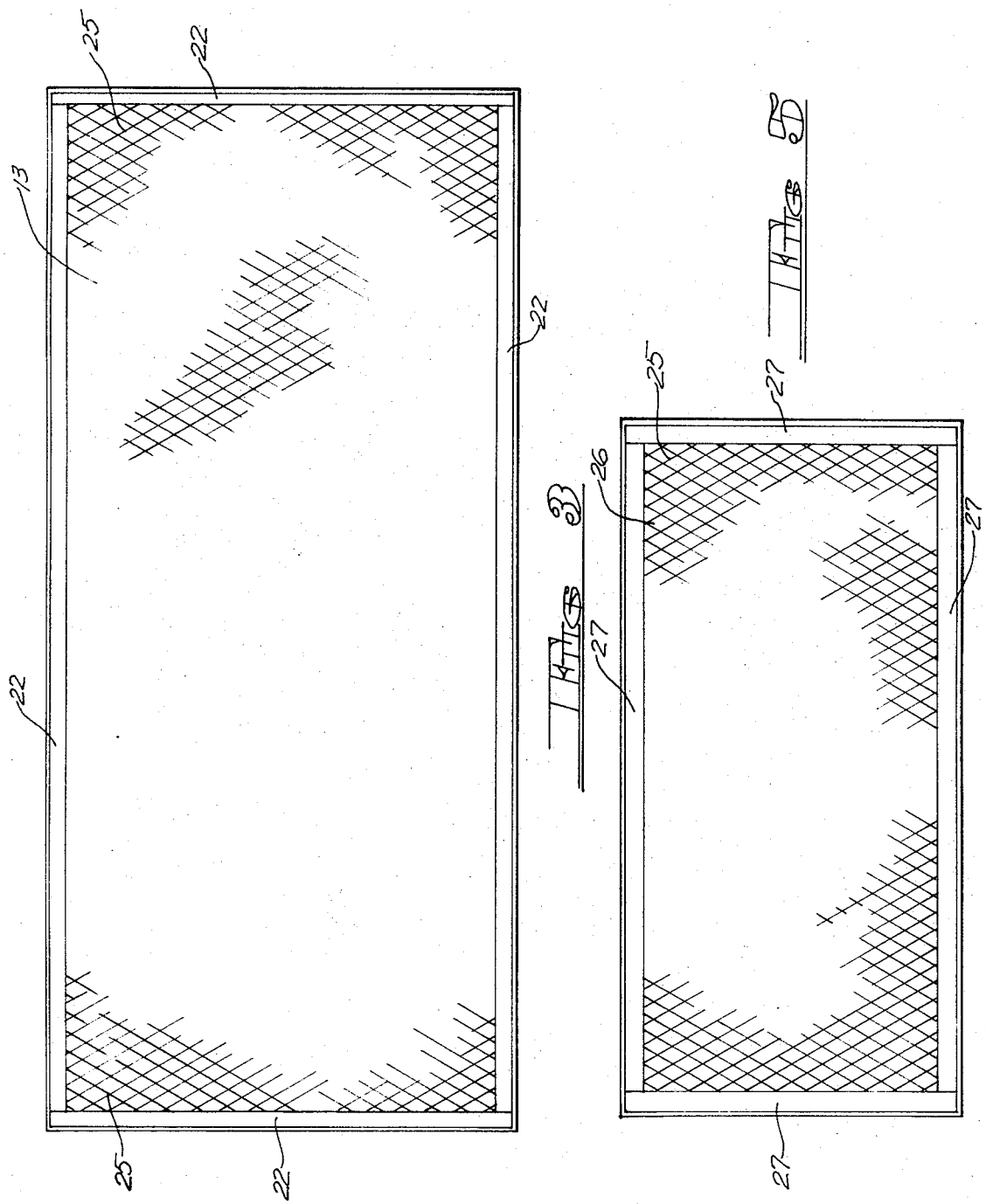

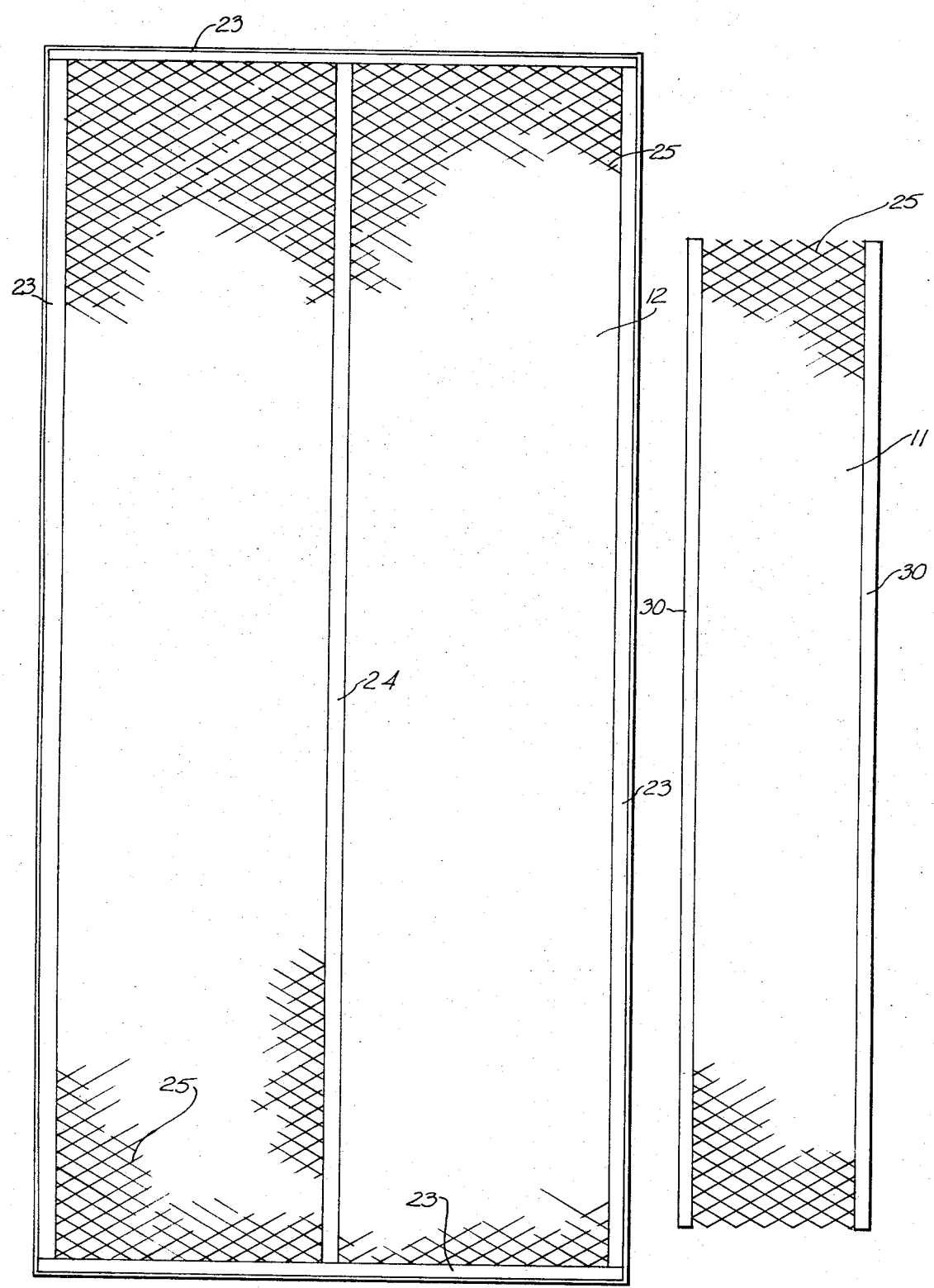

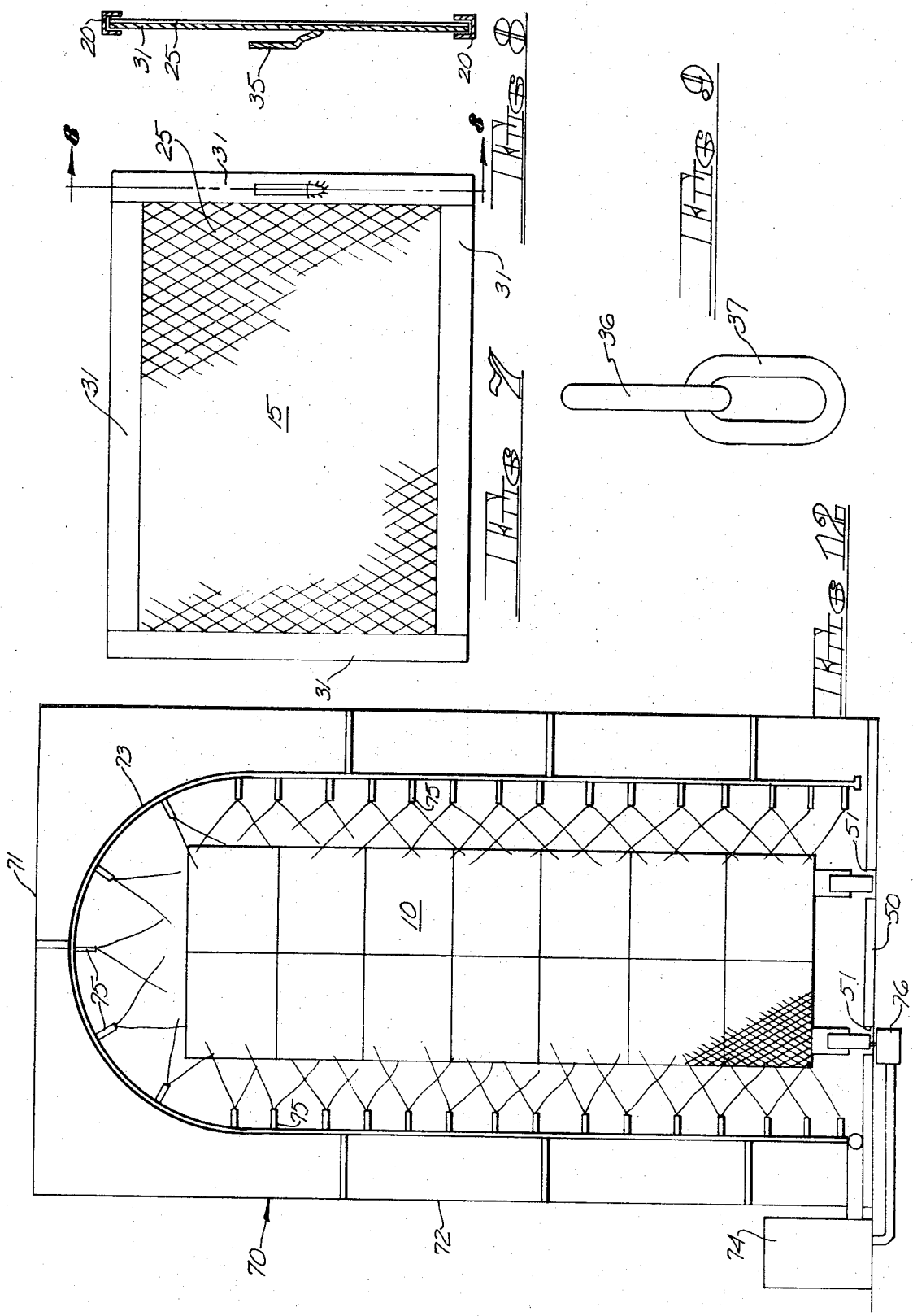

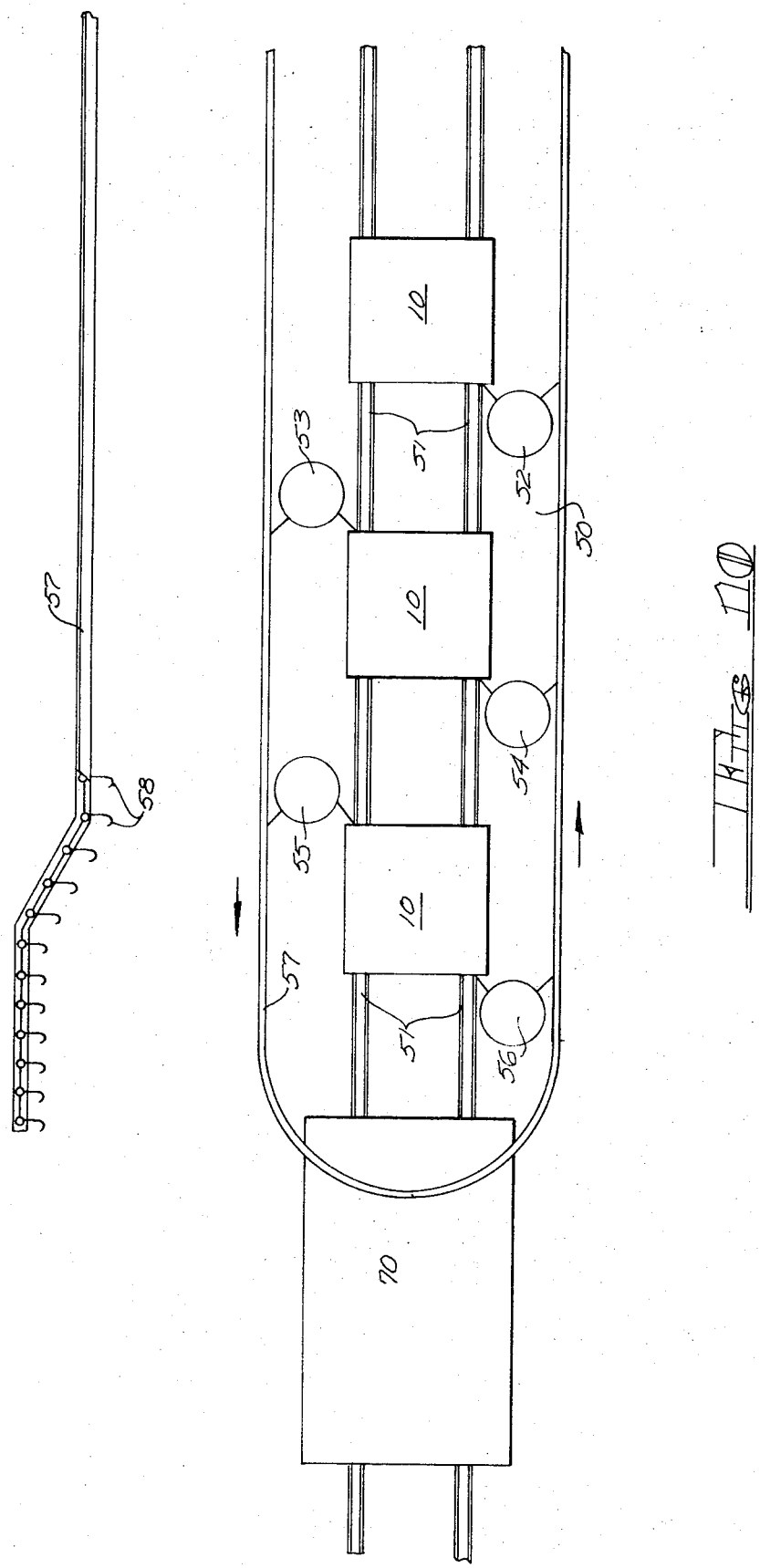

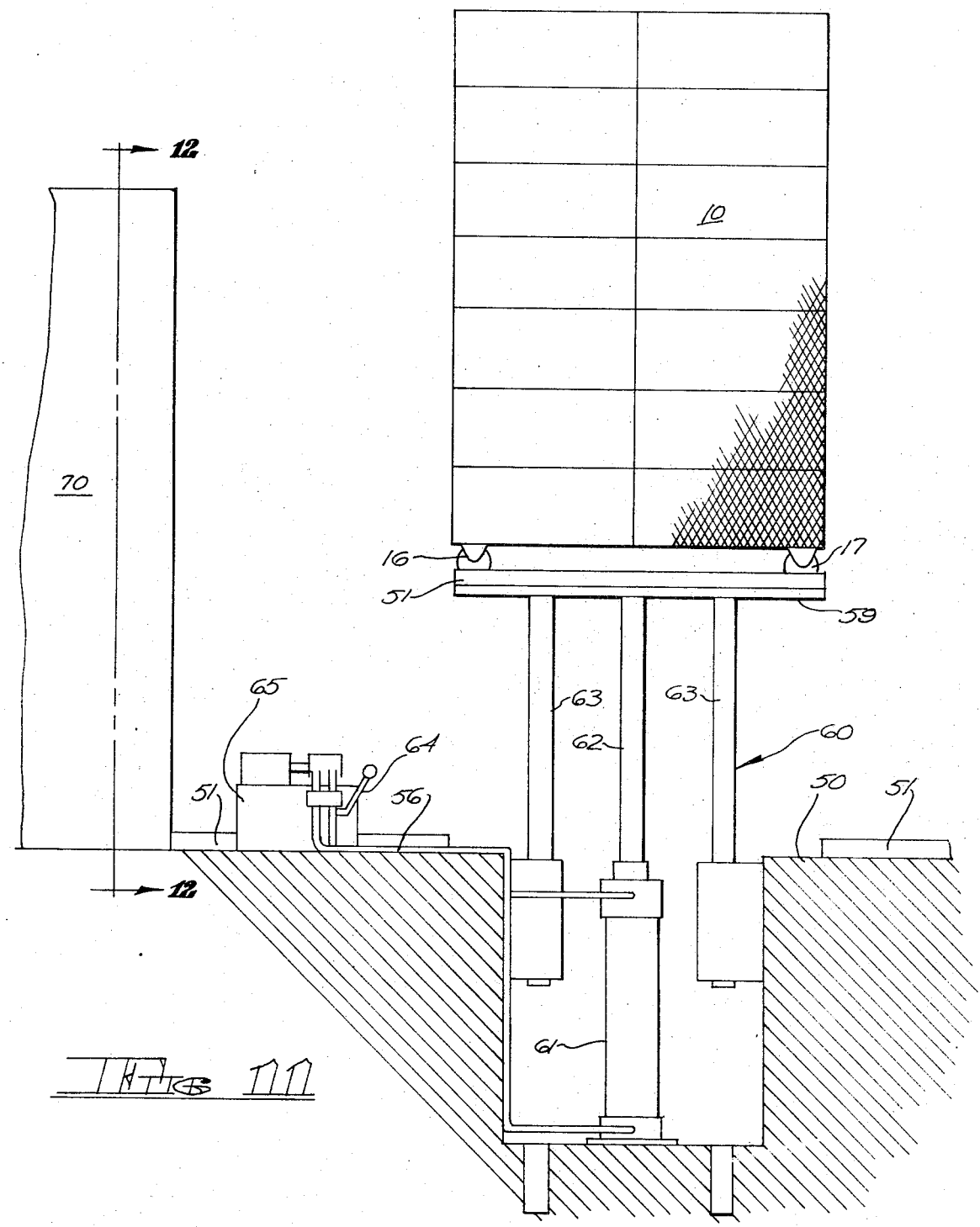

APPARATUS FOR TRANSPORTING, UNLOADING AND PROCESSING LIVE POULTRY

BACKGROUND OF THE INVENTION

1. Field of the Invention

This invention relates to apparatus and a method for loading, transporting, unloading and processing live poultry and to a dolly-type foraminous container for poultry having a plurality of compartments which is particularly adapted for use in such method.

2. Description of the Prior Art

A number of patents disclose foraminous metal cages or coops for poultry which may be provided with wheels for portability. These are fabricated of woven wire mesh or screens with frame members and may be divided into a plurality of compartments. Representative of such prior art are U.S. Pat. Nos. 1,179,703 issued Apr. 1, 1916 to G. E. Dean; 1,469,384 issued Oct. 2, 1923 to J. B. Danley; and 1,863,982 issued June 21, 1932 to C. T. Hatch.

A system for loading and transporting live turkeys is disclosed in U.S. Pat. No. 3,292,581 issued Dec. 20, 1966 to W. B. Van Nest, wherein foraminous metal racks are provided with removable partitiions to form compartments, and means are provided to engage superimposed racks together for lifting by a hoist. A plurality of hinged access doors is provided which open upwardly on the top of each compartment. Unloading is effected by unstacking the superimposed racks, opening the access doors on top of each compartment and removing each bird individually.

The prior art system outlined above for loading, transporting and unloading poultry requires a powered hoist and a separate lifting frame, which are expensive and require skilled operators. The unstacking of superimposed racks for unloading involves substantial labor cost. Access doors on the top of a coop or rack are undesirable because birds can fly out and escape, and it is also difficult for operators to reach in from above and grasp birds by their legs in the proper manner.

SUMMARY

It is a principal object of the present invention to provide apparatus and a method for transporting, unloading and processing poultry which is simple, efficient and sanitary, which avoids the necessity for hoists and similar expensive equipment and which substantially reduces labor costs.

It is a further object of the invention to provide a system of the above type which may be used in existing processing installation with only minor modifications, and which when installed may be used alternatively with a conventional processing system.

These and other objects of the invention are provided in apparatus for transporting, unloading and processing live poultry which comprises a plurality of foraminous metal cages or enclosures each having a plurality of compartments formed by horizontal floor sections and vertical partitions of foraminous metal, wheels mounted on the bottom of each enclosure, at least a pair of wheels being of the full-swivel type, access doors for each compartment formed of foraminous metal which are slidable horizontally between open and closed positions within horizontal opposed channels. The opposed channels may be secured either along the end walls or along the side walls of each enclosure so that access to the interiors of the compartments is provided at opposite ends, or at opposite sides, or on one side only, of the enclosure. Means are provided abutting the doors when in closed position for locking the doors, the locking means being readily releasable by a simple upward movement thereof. Stop means are provided abutting the doors when in open position which prevent sliding movement of the doors beyond fully open position. In the poultry processing plant track means are provided which engage the wheels of the enclosures, and a plurality of unloading stations is designated along the track means at which the poultry is removed from successive tiers of compartments through the access doors.

An overhead conveyor means is provided parallel to the track means along the portion thereof designated as unloading stations, the conveyor means functioning as a "hanging line," as hereinafter explained. An hydraulic elevator is provided adjacent the last unloading station having a platform, on which track sections are secured, of sufficient size to accomodate one of the enclosures. Manually operable means are provided to actuate the elevator and raise the enclosure thereon to a height sufficient to permit ready access by a worker to the lowermost compartments of the enclosure. Manually operable means are provided to lower the elevator to track level after unloading the lowermost compartments. A washer and sterilizer is positioned over a continuation of the track means adjacent the elevator into which each enclosure is rolled after unloading. The washer and sterilizer is an enclosed booth provided with a plurality of high-velocity jet nozzles through which heated water and/or steam containing detergent, germicide, fungicide or the like is directed against the sides and top, at least, of the enclosure from varying angles, thereby cleaning and disinfecting thoroughly all surfaces of the foraminous enclosure. A micro-switch is provided within the washer and sterilizer which is contacted by the enclosure when in proper position to start the flow from the high-velocity jet nozzles. Means are provided to terminate the flow after a predetermined period of time.

The foraminous metal enclosures or cages have particular utility in the system defined above. More specifically, the enclosure is provided with substantially rectangular side walls and end walls, substantially rectangular top wall and a substantially rectangular bottom wall, all of foraminous metal, which are secured together into a unitary structure. A plurality of equally spaced substantially horizontal floor sections are secured between the top and bottom walls. A plurality of substantially vertical partitions is provided extending from side to side of the enclosure. One partition is secured between the top wall and the adjacent floor section, and a single partition is secured between each succeeding adjacent floor section and between the lowermost floor section and the bottom wall. The floor sections and partitions are also formed of foraminous metal and divide the enclosure into tiers of superimposed compartments of equal size. As described above, access means are provided to each compartment comprising foraminous doors slidable horizontally in opposed pairs of horizontal channels secured along the end walls or side walls.

The locking means for the access doors are an important feature of the invention and comprise an elongated steel tongue-like element secured at its lower end near an outer edge of the door. The upper end of the tongue-like element is spaced outwardly from the door surface and is generally parallel thereto. This forms an upstanding unobstructed post or flange over which a chain link can be hooked. This link in turn is engaged with a second similar link which is secured vertically near an outer edge of an end wall or side wall and forms an abutment for the door when in closed position. The first-mentioned link can be easily slipped over the upstanding tongue to lock the door and can easily be released by a simple upward movement, requiring the use of one hand only of a worker for a very brief period of time.

BRIEF DESCRIPTION OF THE DRAWINGS

Reference is made to the accompanying drawings in which:

FIG. 1 is an end plan view of a foraminous metal enclosure according to the invention.

FIG. 2 is a side plan view of the enclosure of FIG. 1.

FIG. 3 is a bottom plan view of a top wall, floor section and bottom wall of the enclosure of FIGS. 1 and 2.

FIG. 4 is a plan view of a side wall of the enclosure of FIGS. 1 and 2.

FIG. 5 is a plan view of a vertical partition panel of the enclosure of FIGS. 1 and 2.

FIG. 6 is a front plan view of an end wall of the enclosure of FIGS. 1 and 2.

FIG. 7 is a front plan view of an access door of the enclosure of FIGS. 1 and 2.

FIG. 8 is a sectional view taken along the lines 8 — 8 of FIG. 7.

FIG. 9 is a front view of a portion of the locking means of the invention.

FIG. 10 is a diagrammatic top view of the unloading and processing system according to the invention.

FIG. 11 is a fragmentary diagrammatic side view of the system of FIG. 10 showing an hydraulic elevator in operation.

FIG. 12 is a section taken along the line 12 — 12 of FIG. 11 showing diagrammatically a washer and sanitizer according to the invention.

DESCRIPTION OF THE PREFERRED EMBODIMENT

Referring to FIGS. 1 and 2 of the drawings, a preferred embodiment of a metal enclosure for loading, transporting and unloading live poultry is indicated generally at 10. The enclosure comprises end walls 11 which may be of identical construction, and side walls 12 which may be of identical construction. Top and bottom walls, which may be of identical construction, are indicated at 13 and 14 respectively.

In the embodiment of FIGS. 1 and 2 access doors indicated generally at 15 are provided in association with the end walls 11. All the access doors are of identical construction.

Although not indicated in the drawings, it is within the scope of the invention to provide access doors in association with the side walls 12 instead of end walls 11. In this embodiment, the structure of the side walls will be modified in the same manner as illustrated in the drawings for the end walls, although the dimension will be different. Moreover, in this embodiment access doors could be provided either in association with the opposite side walls, or all the access doors could be provided on only one side wall.

Four rollers or wheels 16 and 17 are mounted adjacent the four corners of the enclosure on the bottom wall 14. Preferably the wheels or rollers 16 will have a mounting 18 permitting full swiveling, while the roller 17 will be provided with a fixed mounting 19.

The doors 15 are slidable horizontally in opposed sets of horizontally disposed channels extending from side to side of the enclosure, in the embodiment of FIGS. 1 and 2, in a manner to be described hereinafter.

Referring to FIG. 3 of the drawings, a preferred top wall 13 is shown. It will be understood that the bottom wall 14 and a plurality of horizontal floor sections indicated at 21 in FIG. 2 are of identical construction to the top wall 13. This structure comprises a rectangular frame composed of angle members 22 secured together at the four corners, preferably by welding. The foraminous metal surface 25 is preferably expanded steel which is spot welded to the angle iron frame. By way of example, the frame 22 may be composed of one-eighth inch by three-fourths inch by three-fourths angle iron while the foraminous steel surface may be diamond expanded steel, which has been flattened and deburred.

In FIG. 4 a side wall 12 is illustrated. This may comprise a rectangular frame composed of angle iron members 23 secured at the four corners preferably by welding. A reinforcing band 24 is preferably provided secured by welding intermediate the ends of the two shorter angle iron frame members. This reinforcing band may be, by way of example, one-eighth by three-fourths hot rolled steel, while the angle iron members and the foraminous metal surfaces 25 are the same as described above with respect to FIG. 3.

Referring to FIG. 5, a vertical partition designated as 26 is illustrated. This is constructed in the same manner as described above for the top wall 13 of FIG. 3 from angle iron members 27 and expanded steel surface 25.

FIG. 6 illustrates an embodiment of a front wall 11 to be used in association with access doors 15. The wall 11 consists of two parallel hot rolled steel bands 30 extending the full height of the enclosure to which expanded steel surface 25 is secured by spot welding.

Referring to FIGS. 7 and 8, a sliding door designated generally as 15 is comprised of a rectangular frame composed of hot rolled steel bands 31 secured together at the four corners preferably by welding. Expanded steel 25 is secured to the frame members preferably by spot welding.

In assembling the various elements of the unitary enclosure 10, the side walls 12, the top wall 13, bottom wall 14 and horizontal floor sections 21 are first secured together preferably by welding. Next the vertical partitions 26 are secured inside the enclosure, one partition being provided in each tier intermediate the end walls and extending from side to side. These vertical partitions 26 are preferably secured by welding, and it will be understood that these are in alignment with the reinforcing bands 24 of the side walls 12. Next the end walls 11 are secured in place by welding in such manner that they overlie the angle iron frame members of the top wall, floor sections, bottom wall and side wall. Thereafter, the opposed sets of channels 20 are secured in place, preferably by welding, and these will overlie the end walls 11 and the angle iron frame members of the top wall, floor sections and bottom wall.

Referring to FIGS. 7, 8 and 9, the locking means for the sliding doors 15 are indicated at 35, 36 and 37. The element 35 is an elongated steel strip, e.g., one-fourth inch by three-eighths inch hot rolled steel, the lowermost end of which is welded to the outer frame member 31 of door 15. The strip or tongue-like element 35 is curved or offset outwardly to provide an upstanding free end substantially parallel with the surface of the door 15. The cooperating elements 36 and 37 comprise two chain links, and link 36 is welded in a vertical position on the angle iron frame member 23 of side wall 12 so as to abut the door 15 when in closed position adjacent to the element 35. The other link 37 is engaged with the link 36 but is relatively free for partial rotation, so that it can be hooked or slipped over the upstanding free end of element 35. The link 37 thus holds the door 15 in closed position, but it will be apparent that it can be readily released by a single upward movement which can be quickly effected with one hand by a worker.

As shown in FIG. 1, a plurality of stop members 40 is secured, preferably by welding, along the angle iron frame member 23 of side wall 12 opposite the locking means 35, 36 and 37, in such manner as to abut each of the doors 15 when in fully opened position and prevent sliding movement thereof beyond the plane of side wall 12. The stop member 40 may conveniently be a relatively short section of channel iron, both legs of which are welded to frame member 23.

From the above description it will be evident that all surfaces of the enclosure, except frame members, are formed of foraminous material, preferably expanded steel. It is within the scope of the invention to substitute woven steel mesh or screen of appropriate gauge, but expanded steel is preferred since it adds rigidity to the structure and resists bending.

The assembled enclosure preferably is provided with a coat of primer paint followed by a coat of corrosion-resistant paint. Alternatively, the expanded metal and frame members could be galvanized, or could even be fabricated from a corrosion resistant alloy. The expanded metal also permits adequate air circulation throughout all the compartments, and the paint or galvanized finish deflect heat and protect against contamination and corrosion of the metallic surfaces.

Turning next to a consideration of FIGS. 10, 11 and 12, the system for unloading and processing live poultry is illustrated in more or less diagrammatic fashion. It will be understood that poultry is picked up at a farm and loaded into a plurality of the foraminous enclosures 10. These are rolled onto a truck and transported to a processing plant. Upon reaching the plant, the enclosures are rolled off the truck onto a dock space or platform indicated at 50 in FIGS. 10 and 11. A set of tracks 51 is provided on the platform in which the rollers 16, 17 of the enclosures are engaged. These tracks conveniently may be formed of channel iron or angle iron. The enclosures are lined up on the tracks and moved manually or mechanically through a so called "hanging line" which comprises a plurality of unloading stations, designated as 52 – 56. The hanging line comprises a moving conveyor indicated diagrammatically at 57 from which are suspended a plurality of shackles or hangers 58 on which birds are hung individually. The conveyor is substantially parallel with the tracks 51 at least along the portions thereof occupied by the unloading stations. A worker at each unloading station opens one or more of the sliding doors 15 of an enclosure, starting with the uppermost tier, removes the birds therefrom and suspends them on hangers. At the next unloading station birds are removed from one or more lower tiers and suspended from the hanging line. By the time an enclosure reaches the last unloading station all except the lowermost one or two tiers of compartments will have been emptied.

Upon reaching the last station 56 an enclosure 10 is rolled into position on a platform 59 of an hydraulic elevator indicated generally at 60. It will be understood that track sections 51 are provided on the platform 59 which are a continuation of the track sections secured to the platform 50. The hydraulic elevator is of conventional construction and comprises a piston (not shown) movable by pressure fluid in cylinder 61. The piston is connected to shaft 62 which supports platform 59. Guide shafts 63 are preferably provided in order to prevent rotation of the platform 59. A manually operated switch is indicated diagrammatically at 64 and an hydraulic pump at 65. When an enclosure is in position on the elevator platform 59, the switch is turned to actuate upward movement of the shaft 62. The limit of upward movement may be about 30 inches since this has been found to be sufficient to permit easy access by a worker to the poultry in the lowermost one or two tiers of compartments. Upon completion of unloading of these lowermost tiers the manual switch 64 is caused to lower the shaft 62 and platform 59 back to its original level.

Upon completion of unloading of an enclosure, it is moved on a continuation of tracks 51 to a washer and sanitizer or sterilizer indicated generally at 70 in FIGS. 10 and 11. Referring to FIG. 12, it will be seen that a washer-sterilizer comprises top and side housing members 72, 72 which preferably are of stainless steel. A plurality of pipes or tubing 73 is disposed within the housing connected to a pump indicated diagrammatically at 74 through which heated water and/or steam is conducted for discharge through high-velocity jet nozzles 75. It will be understood that detergents, germicides, and/or fungicides may be mixed with the heated water and/or steam or may be supplied in solution through separate sets of pipes for discharge through jet nozzles. An enclosure 10 is thus subjected to the action of the discharge from the jet nozzles from varying angles along both sides and the top. All surfaces of the enclosure 10 are thus thoroughly cleaned and sterilized, so that any contamination which may have been picked up en route will be removed before the enclosures are returned to a poultry farm. In this connection, it should be noted that poultry growers take great pains to provide disease-free areas in which the poultry is housed. It will be apparent these efforts would be useless if containers for transporting poultry brought to the farm from an outside source were not completely sterile and disease-free.

Preferably a micro-switch, indicated diagrammatically at 76 in FIG. 12, is positioned within the washer-sterilizer so that it will be contacted by an enclosure 10 when rolled into place therein. The switch 76 will start the pump 74, thereby initiating flow through pipes 73 and nozzles 75. A time control in the micro-switch 76 maintains the washing action for about 30 to 90 seconds, at which time the flow is shut off. The enclosure 10 is then moved out of the washer-sterilizer and rolled to a pick-up area for return by truck to a poultry farm. By way of exemplary showing, the enclosure of FIGS. 1 and 2 is provided with six tiers of compartments, each tier comprising two compartments of equal size. For ease of handling the unitary enclosure 10 will preferably be provided with six or seven tiers, the height of each compartment being about 9 ½ inches for six tiers and about 8 ½ inches for seven tiers. The dimensions of the end walls and side walls will preferably be about 22 inches and about 48 inches respectively, with the width of access doors, when installed on the end walls, preferably being about 12 inches. A unitary structure of these dimensions will accomodate about 200 20-week old chickens.

It is believed that the method of loading, transporting, unloading and processing live poultry according to the invention is evident from the above description. It will further be apparent that the apparatus and method of the invention provide the following advantages:

An enclosure constructed with the preferred dimensions can readily be moved about by one worker and is unlikely to be overturned whether empty or loaded. The necessity for a powered hoist or the like is thus obviated. This results in a reduction in labor and equipment costs as compared to prior art systems.

The sliding access doors of an enclosure according to the invention are provided in such manner that, upon opening, birds are unlikely to escape and can readily be grasped by the legs in proper manner, thus resulting in less injury to the birds. It will be apparent that hinged doors which swing open are undesirable because they are subject to damage and obstruct free access when unloading the compartments. Moreover, the opposed sets of channels within which the doors slide are self-cleaning, since each opening or closing movement of a door cleans out manure, feathers and the like from the channels.

Existing installations in processing plants can easily be modified to accomodate the apparatus of the present invention. For example, if roller conveyors are present, these can simply be replaced by a parallel set of tracks. Alternatively, where it is desired to continue using existing equipment on a part-time basis until it has worn out, the roller conveyors can be removably installed above the tracks, making it possible to use existing equipment or the apparatus of the invention interchangeably.

Modifications may be made without departing from the spirit and scope of the invention. For example, an optional modification is shown in FIGS. 1 and 2 which will permit lifting an enclosure by a hoist, and/or moving it on an overhead mono-rail where such installations are already present. Two steel straps or bands 80 are secured by welding or otherwise across the top of an enclosure one adjacent each end thereof. Each band 80 has an upwardly extending loop or rectangular offset 81 intermediate its ends providing a slot in which the hook of a hoist may be engaged for lifting. Secured to each upwardly extending offset 81 is a pair of substantially vertical parallel plate members 82, 83 mounting horizontal stub shafts on which rollers 84, 85 are rotatably engaged. The rollers 84, 85 are adapted to roll along both sides of an I-beam mono-rail (not shown), in which case the roller 16, 17 on the bottom of an enclosure would not be used.

The embodiments of the invention in which an exclusive property or privilege is claimed are defined as follows:

1. Apparatus for transporting, unloading and processing live poultry, comprising: a plurality of a foraminous metal enclosures each having a plurality of tiers of superimposed compartments of equal size therein formed by horizontal floor sections and vertical partitions, said floor sections and partitions being formed of foraminous metal, a plurality of wheels mounted on the bottom wall of said enclosure, at least two of said wheels being of the full-swivel type, access doors to the interiors of each compartment, said access doors being formed of foraminous metal and slidable horizontally between open and closed positions within opposed horizontal channels secured along end walls or side walls of said enclosures, means abutting said doors when in closed position for locking said doors, said locking means being readily releasable by upward movement thereof, stop means abutting said doors when in open position for preventing sliding movement of said doors beyond full open position; track means in a processing plant engaging the wheels of said foraminous enclosure, a plurality of unloading stations along said track means at which live poultry is removed from successive tiers of said compartments through said access doors; a moving conveyor parallel to said track means along at least the portion thereof occupied by said unloading stations, said conveyor having a plurality of hangers on which poultry is suspended; an hydraulic elevator adjacent the last unloading station having a platform of sufficient size to accomodate one of said enclosures, manually operable means to actuate said elevator and raise an enclosure thereon to a height permitting ready access to the lowermost compartments of said enclosure, and manually operable means to lower said elevator to track level after unloading of said lowermost compartments.

2. The apparatus claimed in claim 1, including a washer and sterilizer positioned on a continuation of said track means into which said enclosure is rolled after unloading, said washer and sterilizer having a micro-switch actuated by contact with a moving enclosure to turn on a plurality of high-velocity jets of hot water and steam, containing detergent, germicide and the like directed against at least the sides and top of said enclosure, whereby all surfaces of said enclosure are thoroughly cleaned and disinfected by reason of the foraminous nature thereof.

3. The apparatus claimed in claim 1, wherein said opposed horizontal channels are secured along end walls of both ends of said enclosure, and extend from side to side thereof.

4. The apparatus claimed in claim 1, wherein said opposed horizontal channels are secured along side walls on both sides of said enclosure.

5. The apparatus claimed in claim 1, wherein said opposed horizontal channels are secured along one side wall of said enclosure and extend from end to end thereof.

6. The apparatus claimed in claim 1, wherein said foraminous metal is galvanized expanded steel.

7. The apparatus claimed in claim 2, wherein said micro-switch includes a timing mechanism effective to turn off said high-velocity jets after a predetermined time interval.

* * * * *